US008081600B2

(12) United States Patent
Afrashteh et al.

(10) Patent No.: US 8,081,600 B2
(45) Date of Patent: Dec. 20, 2011

(54) SYSTEMS AND METHODS FOR COMMUNICATING BETWEEN BASE STATIONS AND WIRELESS STATIONS

(75) Inventors: Alireza Afrashteh, Great Falls, VA (US); Masoud Olfat, Clarksville, MD (US); Douglas A. Hyslop, Vienna, VA (US); Rajesh M. Gangadhar, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1691 days.

(21) Appl. No.: 11/192,074

(22) Filed: Jul. 29, 2005

(65) Prior Publication Data

US 2007/0025290 A1 Feb. 1, 2007

(51) Int. Cl.
*G01R 31/08* (2006.01)
(52) U.S. Cl. ........................................ 370/330; 370/478
(58) Field of Classification Search .................. 370/277, 370/278, 280, 281, 294, 295, 478, 330; 375/132; 455/552
See application file for complete search history.

(56) References Cited

U.S. PATENT DOCUMENTS

| 6,016,313 | A * | 1/2000 | Foster et al. ................. 370/330 |
| 6,240,077 | B1 | 5/2001 | Vuong et al. |
| 6,611,507 | B1 * | 8/2003 | Hottinen et al. .............. 370/331 |
| 6,909,703 | B2 * | 6/2005 | Terry et al. ................... 370/328 |
| 7,000,021 | B1 * | 2/2006 | Radhakrishnan et al. .... 709/230 |
| 7,248,567 | B2 * | 7/2007 | Desgagne et al. ............ 370/277 |
| 7,313,126 | B2 * | 12/2007 | Yun et al. ..................... 370/344 |
| 7,336,626 | B1 * | 2/2008 | Barratt et al. ................. 370/281 |
| 2002/0071480 | A1 * | 6/2002 | Marjelund et al. ........... 375/141 |
| 2002/0105935 | A1 * | 8/2002 | Miya .............................. 370/342 |
| 2002/0164989 | A1 | 11/2002 | Skillermark et al. |
| 2005/0025093 | A1 * | 2/2005 | Yun et al. ..................... 370/328 |
| 2005/0141450 | A1 * | 6/2005 | Carlton et al. ................ 370/329 |
| 2005/0157694 | A1 * | 7/2005 | Lu et al. ........................ 370/345 |
| 2007/0025291 | A1 | 2/2007 | Afrashteh et al. |
| 2007/0248043 | A1 | 10/2007 | Afrashteh et al. |

OTHER PUBLICATIONS

Hybrid FDD/TDD-CDMA for Third Generation Cellular Systems Gordon J R Povey, Harri Holma and Antti Toskala 1997 The institution of Electrical Engineers.*
Reply After Final Under 37 C.F.R. § 1.116 dated Mar. 12, 2009 in U.S. Appl. No. 11/192,075.
Office Action dated Jan. 21, 2009 in U.S. Appl. No. 11/192,075.
Reply dated Oct. 8, 2008 in U.S. Appl. No. 11/192,075.
Office Action dated Jul. 9, 2008 in U.S. Appl. No. 11/192,075.

* cited by examiner

*Primary Examiner* — Ricky Ngo
*Assistant Examiner* — David Oveissi

(57) ABSTRACT

Systems and methods for communicating between a wireless station and a base station are provided. A base station can allocate both a TDD channel and an FDD channel pair for communicating with a wireless station. The base station can transmit and receive unicast messages using the time slots of the TDD channel or can transmit multicast messages over all time slots of the TDD channel.

24 Claims, 9 Drawing Sheets

SYSTEMS AND METHODS FOR COMMUNICATING BETWEEN BASE STATIONS AND WIRELESS STATIONS

BACKGROUND OF THE INVENTION

Wireless frequency spectrum is controlled by government bodies. These government bodies allocate the frequency spectrum to particular wireless operators, and place conditions on how the frequency spectrum is used. For example, allocated frequency spectrum is typically required to operate either in a time division duplex (TDD) or frequency division duplex (FDD) mode. In a system that operates in a TDD mode, the uplink and downlink channels share the same frequency band, but are transmitted and received by the base station during mutually exclusive periods of time, as illustrated in FIG. 1. In a system that operates in an FDD mode, the uplink and downlink channels are transmitted simultaneously on different frequency bands, as illustrated in FIG. 2.

The 2.5 GHz frequency spectrum currently consists of TDD spectrum, and is being partially re-banded to support FDD. Currently, code division multiple access (CDMA) and the IEEE 802.16 standard, which uses orthogonal frequency division multiple access (OFDMA), both support TDD and FDD modes. Typically, systems which use CDMA or the IEEE 802.16 standard operate in either a TDD or FDD mode. Accordingly, it would be desirable to provide systems and methods that operate using both TDD and FDD channels.

SUMMARY OF THE INVENTION

Systems and methods for communicating between base stations and wireless stations are provided. In accordance with exemplary embodiments of the present invention, an aggregation of TDD and FDD channels are used for communicating between base stations and wireless stations. In particular, a wireless station is allocated a TDD channel and an FDD channel pair. The wireless station receives messages from the base station over the downlink TDD time slot and the downlink FDD channel. By aggregating the TDD and FDD channels, the throughput between the base station and the wireless station is a sum of the throughput of the TDD and FDD channels.

In accordance with one aspect of the present invention, the messages received by the wireless station over the TDD channel are multicast messages and the messages transmitted or received over the FDD channel pair are unicast messages.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
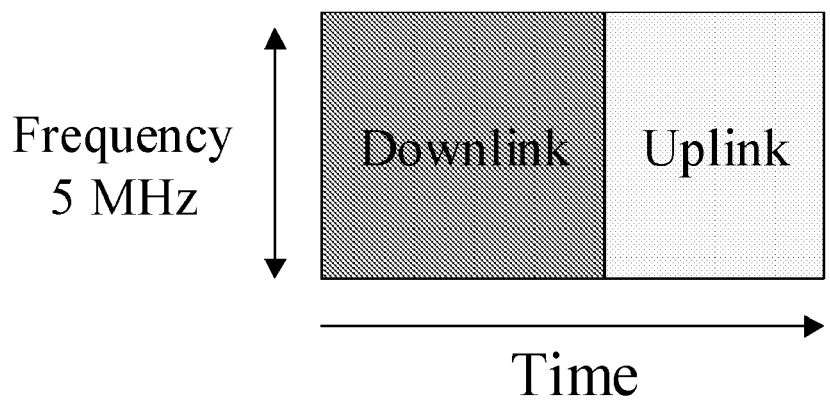
FIG. 1 is a block diagram illustrating TDD uplink and downlink time slots.
Figure 2:
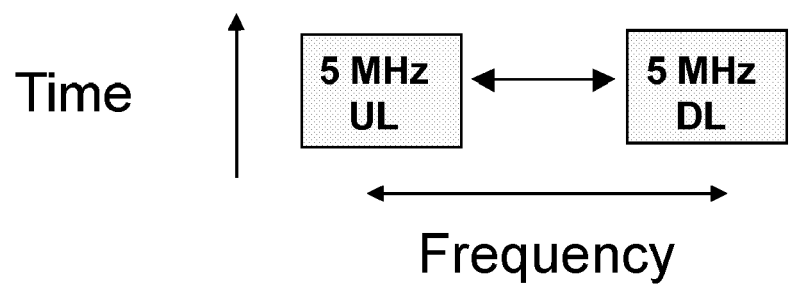
FIG. 2 is a block diagram illustrating an FDD uplink and downlink channel pair.
Figure 3:
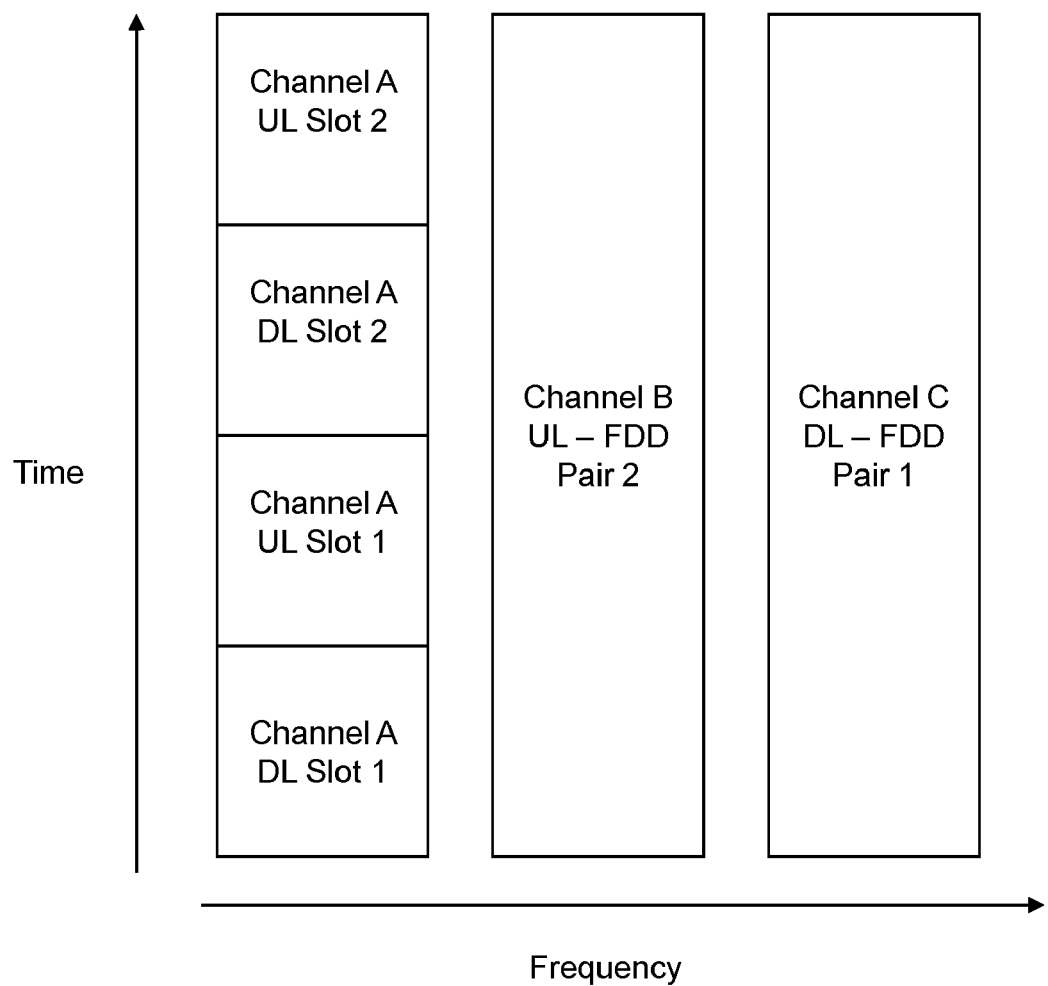
FIG. 3 is a block diagram illustrating exemplary TDD and FDD channels allocated to a base station in accordance with a first aspect of the present invention.

FIG. 3 is a block diagram illustrating exemplary TDD and FDD channels allocated to a base station in accordance with a first aspect of the present invention. As illustrated in FIG. 3, a wireless network operator's base station may be allocated both a TDD channel and an FDD channel pair. Specifically, the base station can operate using the consecutive downlink (DL) and uplink (UL) time slots of the TDD channel while simultaneously using the uplink and downlink FDD channel pairs. Although the uplink and downlink channels of the FDD channel pair are illustrated as adjacent to each other in the frequency spectrum, these channels may be separated by other channels (which may be assigned to other wireless network operators or other base station of the same wireless network operator). Moreover, the uplink and downlink time slots in the TDD channel can be arranged such that the downlink time slot occurs before the uplink time slot. Additionally, the order of the TDD channel relative to the FDD channels and/or the order of the uplink and downlink FDD channels in the frequency spectrum can be different from that illustrated in FIG. 3 without affecting the present invention. Although FIG. 3 illustrates only one TDD channel and one FDD channel pair, a base station may be allocated a number of these channels.

Figure 4A:
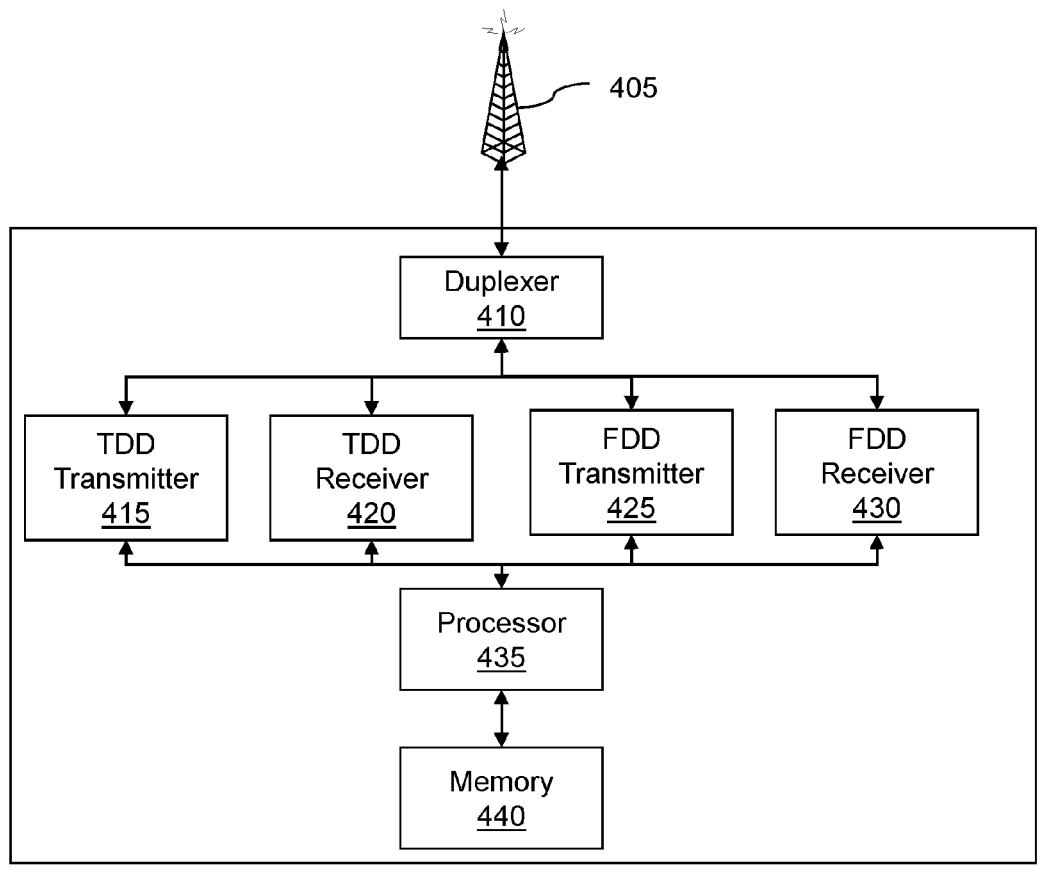
FIG. 4a is a block diagram illustrating an exemplary base station in accordance with a first aspect of the present invention.

FIG. 4a is a block diagram illustrating an exemplary base station in accordance with a first aspect of the present invention. The base station includes a base station antenna 405 coupled to a duplexer 410. The duplexer 410 is coupled to a TDD transmitter 415, TDD receiver 420, FDD transmitter 425 and FDD receiver 430. The transmitters 415 and 425 and receivers 420 and 430 represent the entire radio frequency processing chain, i.e., they can include down converters, baseband processors, and the like. Although FIG. 4a illustrates only one TDD transmitter 415 and receiver 420, the base station can have more than one of each if the base station supports more than one TDD channel. Similarly, if the base station supports more than one FDD channel pair, the base station can include more than one FDD transmitter 425 and receiver 430.

Processor 435 is coupled to transmitters 415 and 425 and receivers 420 and 430. Processor 435 can be a microprocessor, field programmable gate array (FPGA), application specific integrated circuit (ASIC) and/or the like. Processor 435 is also coupled to a memory 440. Memory 440 can be a random access memory (RAM), read only memory (ROM), flash memory, hard disk and/or the like. The operation of the base station will be described in more detail below in connection with the flow diagram of FIG. 5a.

Figure 4B:
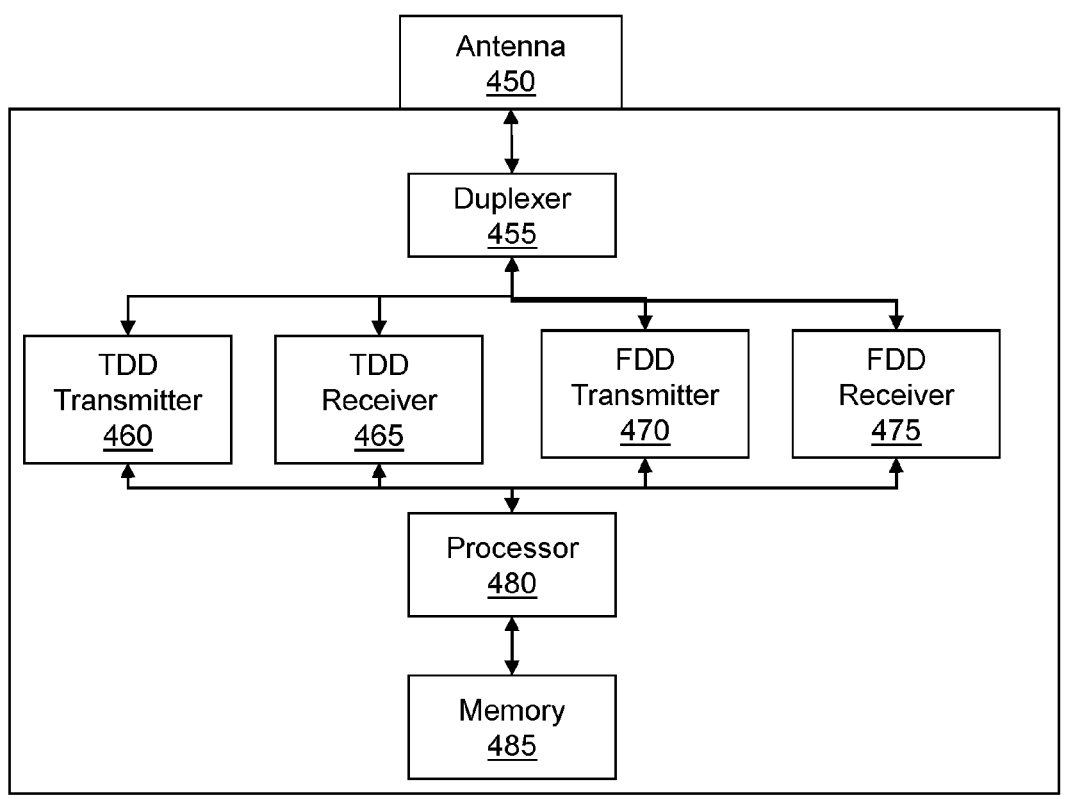
FIG. 4b is a block diagram illustrating an exemplary wireless station in accordance with a first aspect of the present invention.

FIG. 4b is a block diagram illustrating an exemplary wireless station in accordance with a first aspect of the present invention. The wireless station can be a wireless telephone, computer, personal digital assistant (PDA) and/or the like. The wireless station includes antenna 450 coupled to a duplexer 455. The duplexer 455 is coupled to a TDD transmitter 460, TDD receiver 465, FDD transmitter 470 and FDD receiver 475. The transmitters 460 and 470 and receivers 465 and 475 represent the entire radio frequency processing chain, i.e., they can include down converters, baseband processors, and the like. A processor 480 is also coupled to transmitters 460 and 470 and receivers 465 and 475. Processor 480 can be a microprocessor, field programmable gate array (FPGA), application specific integrated circuit (ASIC) and/or the like. Processor 480 is coupled to a memory 485. Memory 485 can be a random access memory (RAM), read only memory (ROM), flash memory, hard disk and/or the like. The operation of the base station will be described in more detail below in connection with the flow diagram of FIG. 5b.

Although the base station of FIG. 4a and the wireless station of FIG. 4b are illustrated with similar components, these components will operate differently, due to the differences between the functionality and requirements of the base station and wireless stations. For example, wireless stations typically operate using components and techniques designed to conserve power because they operate using batteries, and base stations typically require components capable of generating high transmission powers.

Figure 5A:
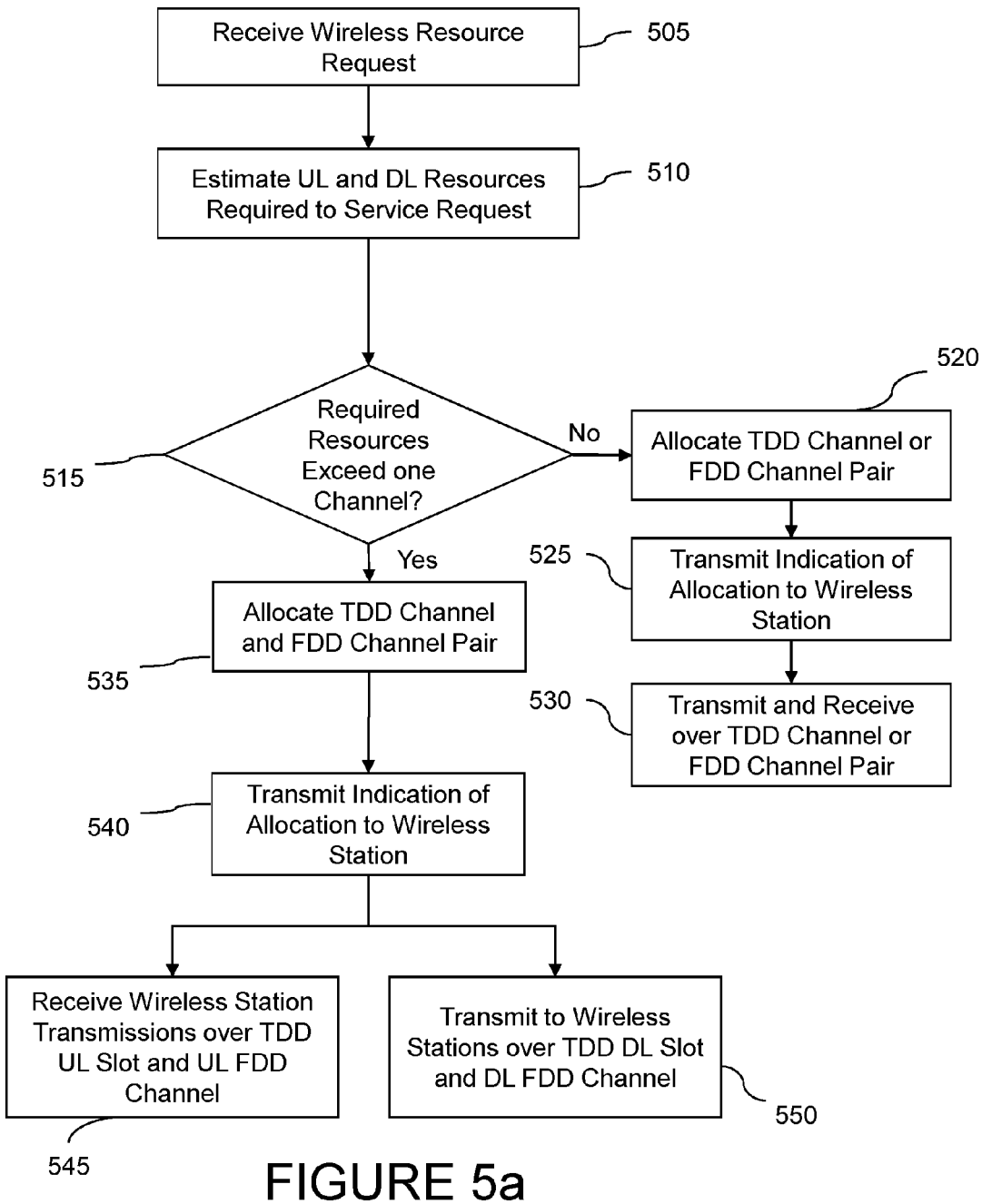
FIG. 5a is a flow diagram illustrating an exemplary method for a base station communicating with a wireless station in accordance with a first aspect of the present invention.

FIG. 5a is a flow diagram illustrating an exemplary method for a base station communicating with a wireless station in accordance with a first aspect of the present invention. After the base station receives a wireless resource request from a wireless station (step 505), the processor 435 of the base station estimates the uplink and downlink resources required to support the resource request (step 510). The estimate can be based on the information provided in the resource request received from the wireless station, or based upon any other known technique. When the resources required to support the request do not exceed the resources available from one channel ("No" path out of decision step 515), then the processor 435 allocates a TDD channel or an FDD channel pair (step 520), transmits an indication of the allocation to the wireless station (step 525), and then proceeds to transmit and receive over the allocated TDD channel or FDD channel pair (step 530).

When the resources required to support the request exceed the resources available from one channel ("Yes" path out of decision step 515), then the processor 435 allocates a TDD channel and FDD channel pair to the wireless station (step 535) and transmits an indication of the allocation to the wireless station (step 540). The processor 435 controls TDD receiver 420 so that it receives from the wireless station over the allocated uplink slot of the TDD channel, and FDD receiver 430 so that it receives from the wireless station over the allocated uplink FDD channel (step 545). At substantially the same time, processor 435 controls TDD transmitter 415 so that it transmits to the wireless station over the allocated downlink TDD slot and controls FDD transmitter 425 to transmit to the wireless station over the allocated downlink FDD channel (step 550). Because some types of communications may be discontinuous, the base station may not be receiving from the wireless station at a particular time and it may not be transmitting to the wireless station at a particular time. Moreover, the base station may transmit over only the TDD downlink time slot or the downlink FDD channel at any particular time, and/or receive over the TDD uplink time slot or the uplink FDD channel at any particular time.

Figure 5B:
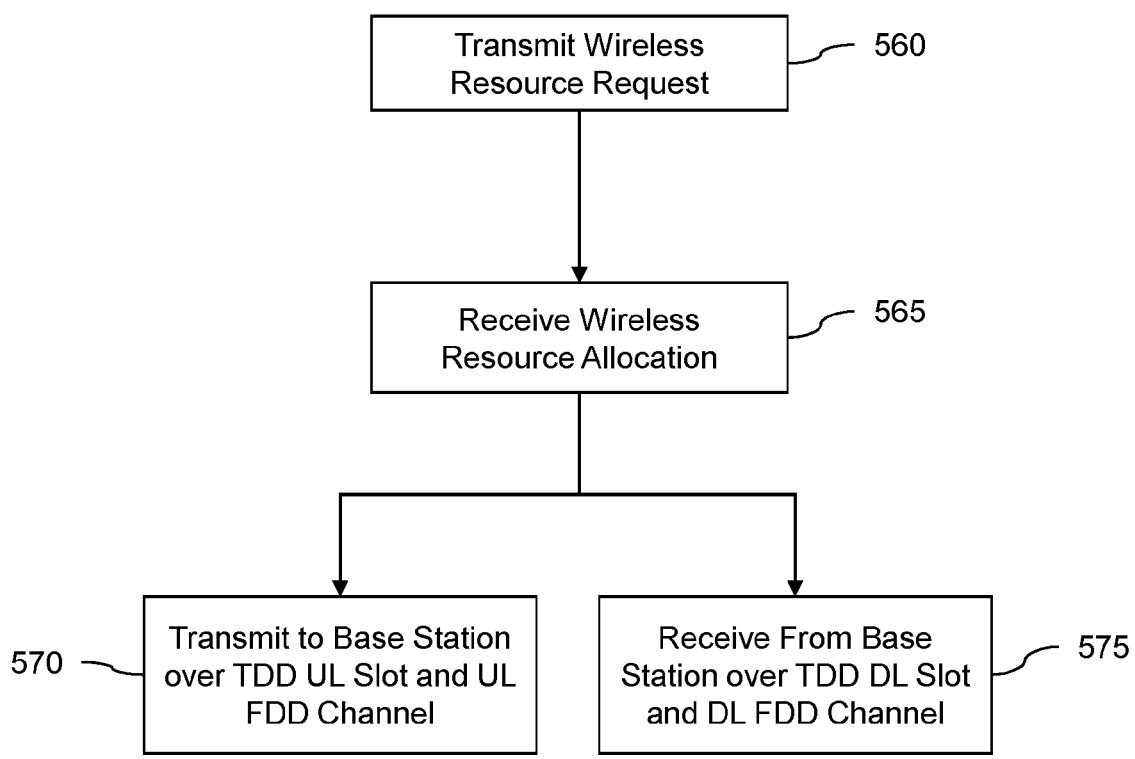
FIG. 5b is a flow diagram illustrating an exemplary method for a wireless station communicating with a base station in accordance with a first aspect of the present invention.

FIG. 5b is a flow diagram illustrating an exemplary method for a wireless station communicating with a base station in accordance with a first aspect of the present invention. Processor 480 controls one of the transmitters 460 or 470 to transmit a wireless resource allocation request, which may or may not include information used for estimating the resources required to support the channel, to the base station (step 560). After the wireless station receives the wireless resource allocation (step 565), processor 480 controls transmitters 460 and 470 in order to transmit to the base station over the TDD uplink time slot and the uplink FDD channel, respectively (step 570). Processor 480 also controls receivers 465 and 475 in order to receive from the base station over the TDD downlink time slot and the downlink FDD channel, respectively (step 575). Similar to that discussed above with regard to the base station, the wireless station may not be receiving from the base station at a particular time and it may not be transmitting to the base station at a particular time. Moreover, the wireless station may not transmit over the TDD uplink time slot or the uplink FDD channel at any particular time, and/or receive over only the TDD downlink time slot or the downlink FDD channel at any particular time.

In accordance with the aspect of the present invention discussed above, a wireless station can be allocated a TDD uplink and downlink channel and an uplink and downlink FDD channel pair. Because these channels are allocated exclusively to the wireless station, only unicast messages (i.e., messages addressed only to the base station or the wireless station) can be exchanged over the allocated channels. In accordance with a second aspect of the present invention, the FDD channel pair is allocated for unicast messages between the wireless station and the base station, and the TDD channel is used for transmitting multicast messages (i.e., messages addressed to more than one destination). Because multicast messages are typically only transmitted in the downlink direction (when they are transmitted in the uplink they are initially addressed to the base station which assists in multicasting the message), the base station uses both the uplink and downlink time slots of the TDD channel to transmit multicast messages to wireless stations.

Figure 6A:
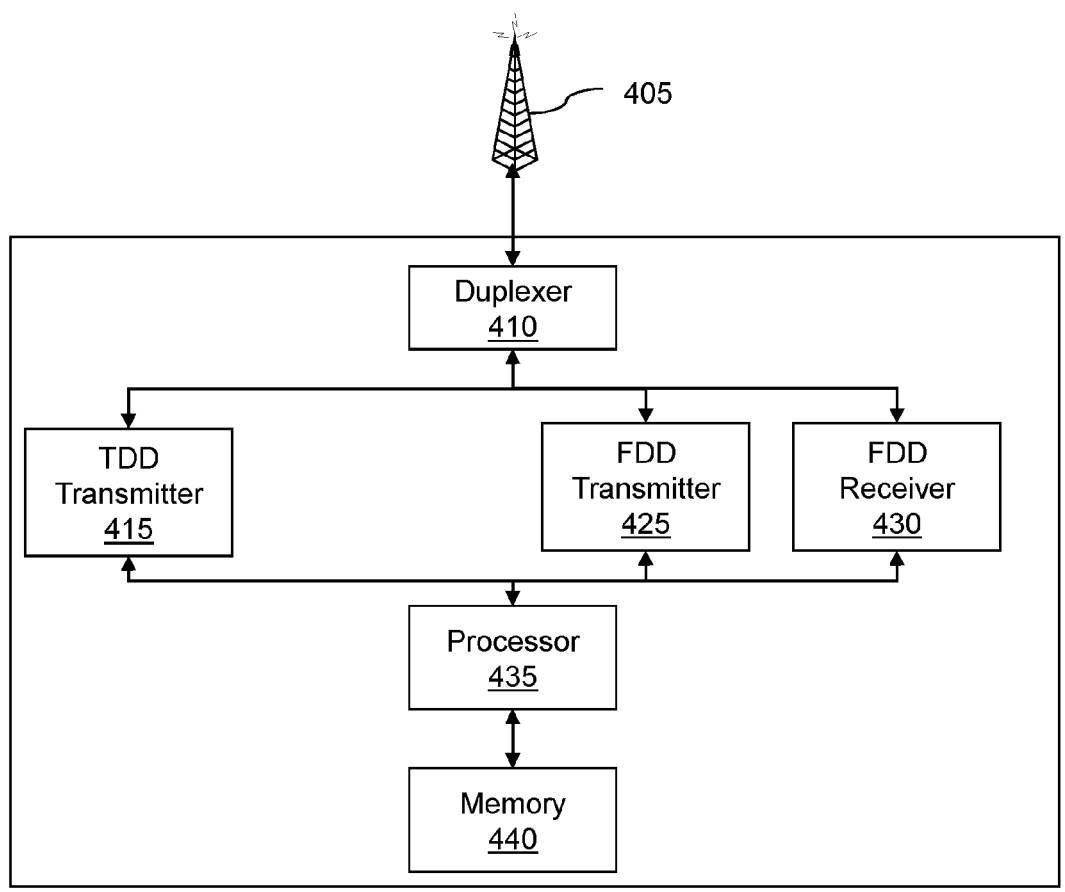
FIG. 6a is a block diagram illustrating an exemplary base station in accordance with a second aspect of the present invention.

FIG. 6a is a block diagram illustrating an exemplary base station in accordance with a second aspect of the present invention. As illustrated in FIG. 6a, the base station according to the second aspect of the present invention includes all of the elements of the base station of the first aspect of the invention except for the TDD receiver 420, because the base station does not receive any messages over the TDD uplink time slot. Similarly, the wireless station according to the second aspect of the present invention illustrated in FIG. 6b includes all of the elements of the wireless station of the first aspect of the invention except for a TDD transmitter 460, because the wireless station does not transmit over the TDD channel.

Figure 6B:
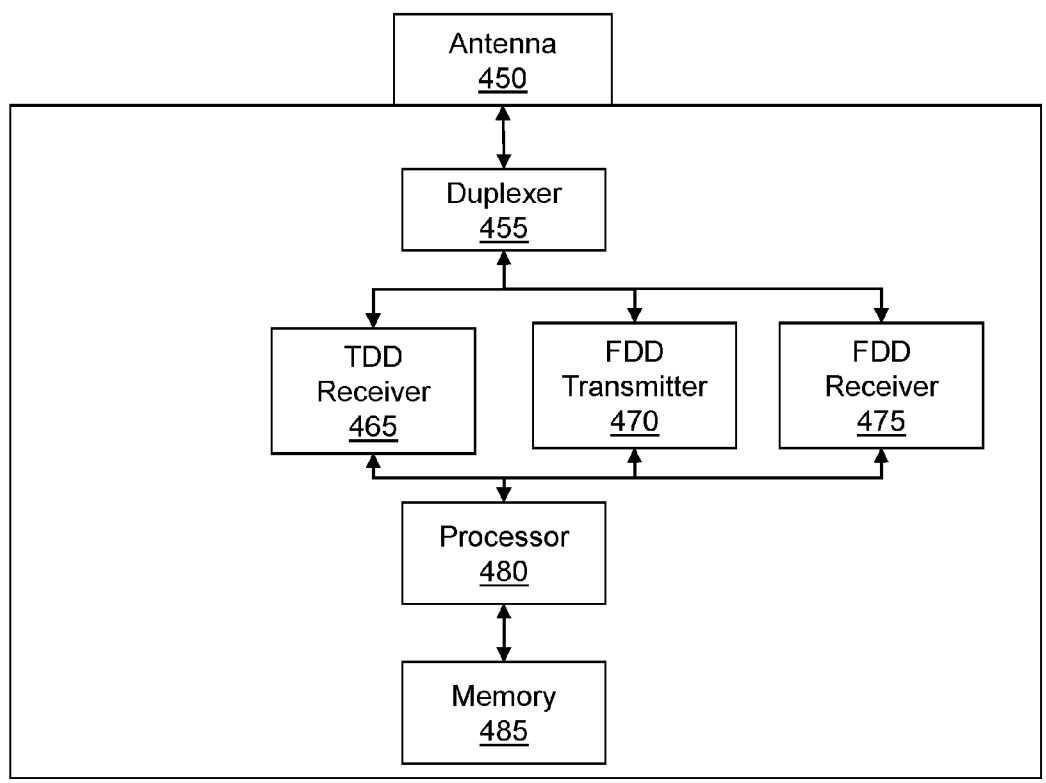
FIG. 6b is a block diagram illustrating an exemplary wireless station in accordance with a second aspect of the present invention.

It should be recognized that base station and wireless station illustrated in FIGS. 6a and 6b are used in systems where the TDD channel is only used for multicast messages. However, systems in which some TDD channels are used only for multicast messages and other TDD channels are used only for unicast messages, the base stations can include the TDD receiver 420 and the wireless stations can include the TDD transmitter 460, although these will only be used in portions of the system where unicast messaging is supported on the TDD channels.

Figure 7A:
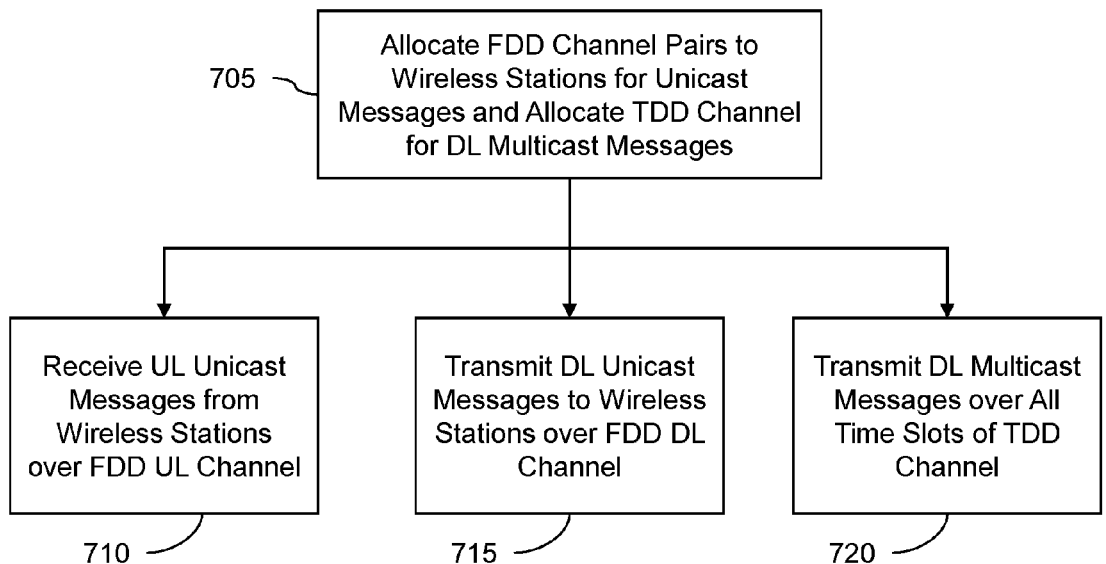
FIG. 7a is a flow diagram illustrating an exemplary method for a base station communicating with a wireless station in accordance with a second aspect of the present invention.

FIG. 7a is a flow diagram illustrating an exemplary method for a base station communicating with a wireless station in accordance with the second aspect of the present invention. The processor 435 allocates FDD channel pairs to wireless stations for unicast messages and a TDD channel for downlink multicast messages (step 705). The processor 435 then controls receiver 430 in order to receive uplink unicast messages from wireless stations over the FDD uplink channel (step 710), and transmitters 415 and 425 in order to transmit unicast messages to wireless stations over the FDD downlink channel (step 715) and multicast messages over all of the time slots of the TDD channel (step 720).

Figure 7B:
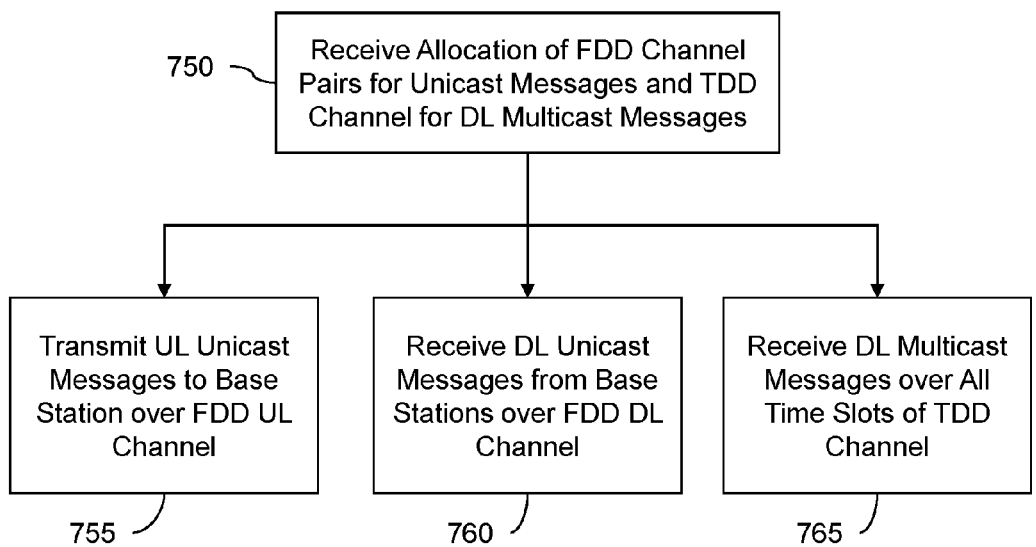
FIG. 7b is a flow diagram illustrating an exemplary method for a wireless station communicating with a base station in accordance with a second aspect of the present invention.

FIG. 7b is a flow diagram illustrating an exemplary method for a wireless station communicating with a base station in accordance with the second aspect of the present invention. The wireless station receives a wireless resource allocation of FDD channel pairs for unicast messages and a TDD channel for downlink multicast messages (step 750). The processor 480 can then control transmitter 470 in order to transmit uplink unicast messages over the FDD uplink channel (step 755), and receivers 465 and 475 in order to receive downlink unicast messages over the FDD downlink channel (step 760) and downlink multicast messages over all of the time slots of the TDD channel (step 765).

By allocating the entire TDD channel for multicast transmissions, this channel can be used for video broadcasting technologies, such as MediaFLO, DVB-H or the like. As an alternative to using the entire TDD channel for multicasting, the channel can be used as a backhaul from a base station to the wireless core network. In this scenario one base station would use the TDD channel for transmitting and receiving information over a backhaul link and a second base station, which has a hard-wired connection to the wireless core network, can receive and transmit the information over the TDD channel to the first base station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communicating between a base station and a wireless station, comprising:
   allocating, by the base station, a time division duplex channel to the wireless station;
   allocating, by the base station, a frequency division duplex channel pair to the wireless station; and
   transmitting from the base station to the wireless station over a downlink time slot of the time division duplex channel while simultaneously transmitting from the base station to the wireless station or receiving by the base station from the wireless station over a channel of the frequency division duplex channel pair, wherein the time division duplex channel is distinct from the frequency division duplex channel pair.

2. The method of claim 1, further comprising:
   receiving a wireless resource request from the wireless station, wherein the allocations are performed in response to the request.

3. The method of claim 2, further comprising:
   estimating an amount of wireless resources for satisfying the wireless resource request.

4. The method of claim 1, further comprising:
   receiving from the wireless station over an uplink time slot of the time division duplex channel while simultaneously transmitting to the wireless station or receiving from the wireless station over another channel of the frequency division duplex channel pair.

5. A method for communicating between a base station and a wireless station, comprising:
   receiving, by the wireless station, a time division duplex channel allocation from the base station;
   receiving, by the wireless station, a frequency division duplex channel pair allocation from the base station; and
   transmitting, by the wireless station, to the base station over an uplink time slot of the time division duplex channel while simultaneously transmitting to the base station or receiving from the base station over a channel of the frequency division duplex channel pair, wherein the time division duplex channel is distinct from the frequency division duplex channel pair.

6. The method of claim 5, further comprising:
   transmitting, by the wireless station, a wireless resource request to the base station, wherein the allocations are performed in response to the request.

7. The method of claim 6, further comprising:
   estimating an amount of wireless resources for satisfying the wireless resource request, wherein the estimate is included in the transmitted wireless resource request.

8. The method of claim 5, further comprising:
   receiving, by the wireless station, from the base station over a downlink time slot of the time division duplex channel while simultaneously transmitting to the base station or receiving from the base station over another channel of the frequency division duplex channel pair.

9. A base station configured to transmit to a wireless station over a downlink time slot of a time division duplex channel while simultaneously transmitting to the wireless station over a channel of a frequency division duplex channel pair.

10. The base station of claim 9, wherein the base station is further configured to receive from the wireless station over an uplink time slot of the time division duplex channel while simultaneously transmitting to the wireless station or receiving from the wireless station over another channel of the frequency division duplex channel pair.

11. The base station of claim 9, wherein multicast messages are transmitted over the downlink time slot of the time division duplex channel.

12. The base station of claim 11, wherein unicast messages transmitted or received over the channel of frequency division duplex pair.

13. The base station of claim 9, wherein the base station is further configured to transmit to the wireless station over all time slots of the time division duplex channel while simultaneously transmitting to the wireless station or receiving from the wireless station over a frequency division duplex channel pair.

14. A wireless station configured to receive from a base station over a downlink time slot of a time division duplex channel while simultaneously receiving from the base station over a channel of a frequency division duplex channel pair.

15. The wireless station of claim 14, wherein the wireless station is further configured to transmit to the base station over an uplink time slot of the time division duplex channel while simultaneously transmitting to the base station or receiving from the base station over another channel of the frequency division duplex channel pair.

16. The wireless station of claim 14, wherein messages received over the downlink time slot of the time division duplex channel are multicast messages.

17. The wireless station of claim 16, wherein messages transmitted or received over the channel of the frequency division duplex pair are unicast messages.

18. The wireless station of claim 14, wherein the wireless station is further configured to receive from the base station over all time slots of the time division duplex channel while simultaneously transmitting to the base station or receiving from the base station over a frequency division duplex channel pair.

19. A method for communicating between a base station and a wireless station, comprising:
    allocating, by the base station, a time division duplex channel to at least the wireless station for multicast messages;
    allocating, by the base station, a frequency division duplex channel pair to the wireless station for unicast messages; and
    transmitting from the base station to the wireless station over a downlink time slot of the time division duplex channel while simultaneously transmitting from the base station to the wireless station or receiving by the base station from the wireless station over a channel of the frequency division duplex channel pair, wherein the time division duplex channel is distinct from the frequency division duplex channel pair.

20. The method of claim 19, further comprising:
    transmitting to the wireless station over an uplink time slot of the time division duplex channel while simultaneously transmitting to the wireless station or receiving from the wireless station over another channel of the frequency division duplex channel pair.

21. The method of claim 19, further comprising:
    receiving a wireless resource request from the wireless station, wherein the allocations are performed in response to the request.

22. A method for communicating between a base station and a wireless station, comprising:
    receiving, by the wireless station, a time division duplex channel allocation from the base station for multicast messages;
    receiving, by the wireless station, a frequency division duplex channel pair allocation from the base station for unicast messages; and
    receiving, by the wireless station, from the base station over a downlink time slot of the time division duplex channel while simultaneously transmitting to the base station or receiving from the base station over a channel of the frequency division duplex channel pair, wherein the time division duplex channel is distinct from the frequency division duplex channel pair.

23. The method of claim 22, further comprising:
    receiving, by the wireless station, from the base station over an uplink time slot of the time division duplex channel while simultaneously transmitting to the base station or receiving from the base station over another channel of the frequency division duplex channel pair.

24. The method of claim 22, further comprising:
    transmitting, by the wireless station, a wireless resource request to the base station, wherein the channels are allocated in response to the request.

* * * * *